United States Patent
Nagumo

(10) Patent No.: US 10,889,131 B2
(45) Date of Patent: Jan. 12, 2021

(54) IRRADIATION DEVICE, EXPANSION DEVICE, AND SHAPING SYSTEM

(71) Applicant: CASIO COMPUTER CO., LTD., Tokyo (JP)

(72) Inventor: Shinji Nagumo, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 79 days.

(21) Appl. No.: 16/271,157

(22) Filed: Feb. 8, 2019

(65) Prior Publication Data
US 2019/0248160 A1 Aug. 15, 2019

(30) Foreign Application Priority Data

Feb. 15, 2018 (JP) ................................ 2018-025001
Feb. 4, 2019 (JP) ................................ 2019-018187

(51) Int. Cl.
*B41J 11/00* (2006.01)
*B29C 64/264* (2017.01)
*B41M 3/06* (2006.01)
*B41M 3/16* (2006.01)
(Continued)

(52) U.S. Cl.
CPC ........... *B41J 11/002* (2013.01); *B29C 64/264* (2017.08); *B41J 11/0015* (2013.01); *B41M 3/06* (2013.01); *B41M 3/16* (2013.01); *B41M 5/26* (2013.01); *B41M 7/009* (2013.01); *B41M 7/0081* (2013.01)

(58) Field of Classification Search
CPC ....... B41J 11/002; B29C 64/264; B41M 3/06; B41M 3/16; B41M 5/26; B41M 7/0081; B41M 7/009
See application file for complete search history.

(56) References Cited

U.S. PATENT DOCUMENTS 4,994,642 A * 2/1991 Matsumoto ............ G03B 27/32
219/216
5,122,430 A * 6/1992 Nishitsuji ................ B41M 3/16
106/31.9
(Continued)

FOREIGN PATENT DOCUMENTS

JP S48-103104 A 12/1973
JP S62-70851 A 4/1987
(Continued)

OTHER PUBLICATIONS

Notice of Reasons for Refusal dated Feb. 25, 2020 received in Japanese Patent Application No. JP 2019-018187 together with an English language translation.

*Primary Examiner* — Matthew Luu
*Assistant Examiner* — Kendrick X Liu
(74) *Attorney, Agent, or Firm* — Scully Scott Murphy & Presser

(57) ABSTRACT

An irradiator that emits electromagnetic waves through a lattice-like or net-like protective member, and a controller that causes the irradiator to irradiate an irradiation target with the electromagnetic waves while causing relative movement between the irradiation target and the irradiator in a first direction. The protective member is configured or disposed such that no more than one lattice of a plurality of lattices and no more than one node of a plurality of nodes that are formed in the protection member exist in a row along the first direction.

11 Claims, 11 Drawing Sheets

(51) Int. Cl.
*B41M 5/26* (2006.01)
*B41M 7/00* (2006.01)

(56) References Cited

U.S. PATENT DOCUMENTS

| | | | | |
|---|---|---|---|---|
| 5,554,490 A | * | 9/1996 | Imaeda | B41J 2/325 |
| | | | | 430/322 |
| 2005/0212855 A1 | * | 9/2005 | Yokoyama | B41J 11/002 |
| | | | | 347/45 |
| 2013/0229478 A1 | * | 9/2013 | Horiuchi | B41M 7/009 |
| | | | | 347/188 |

FOREIGN PATENT DOCUMENTS

| | | |
|---|---|---|
| JP | S64-028660 A | 1/1989 |
| JP | H09-68757 A | 3/1997 |
| JP | 2000-203001 A | 7/2000 |
| JP | 2001-150812 A | 6/2001 |
| JP | 2005-279943 A | 10/2005 |
| JP | 2017-012988 A | 1/2017 |

* cited by examiner

PRINT CONVERSION LAYER ON FRONT SIDE

IRRADIATE FRONT SIDE

PRINT COLOR INK LAYER ON FRONT SIDE

PRINT CONVERSION LAYER ON BACK SIDE

IRRADIATE BACK SIDE

IRRADIATION DEVICE, EXPANSION DEVICE, AND SHAPING SYSTEM

CROSS-REFERENCE TO RELATED APPLICATION

This application claims the benefit of Japanese Patent Application No. 2018-025001, filed on Feb. 15, 2018 and Japanese Patent Application No. 2019-018187, filed on Feb. 4, 2019, the entire disclosure of which is incorporated by reference herein.

FIELD

This application relates generally to an irradiation device, an expansion device, and a shaping system.

BACKGROUND

In the related art, techniques are known for shaping shaped objects. For example, Unexamined Japanese Patent Application Kokai Publication Nos. S64-28660 and 2001-150812 describe forming methods for shaped objects that extend in three-dimensions. Specifically, in the methods described in Unexamined Japanese Patent Application Kokai Publication Nos. S64-28660 and 2001-150812, a pattern is formed on the back side of a thermally expandable sheet using a material having excellent light absorptivity, and the formed pattern is heated by irradiating the pattern with light by irradiation means. As a result of this configuration, the portion of the thermally expandable sheet where the pattern is formed distends and rises, and a shaped object is formed.

With the irradiation devices described in Unexamined Japanese Patent Application Kokai Publication Nos. S64-28660 and 2001-150812, an irradiator such as a light source lamp directly faces the thermally expandable sheet or similar irradiation target. Accordingly, there is a technique for providing a mesh-like lamp cover between the light source lamp and the sheet. This mesh-like lamp cover serves as a protecting member that protects the light source lamp and also prevents the lamp from coming in contact with the sheet. However, when using a mesh-like lamp cover, the irradiation from the light source lamp is insufficient directly under the intersection portions of the mesh. This leads to the problem of uneven lamp irradiation on the irradiation target.

In light of such a problem, an objective of the present disclosure is to provide an irradiation device, an expansion device, and a shaping system in which a protective member is used that is capable of reducing unevenness in lamp irradiation on the irradiation target.

SUMMARY

In order to solve the problem described above, one mode of an irradiation device according to the present disclosure includes:
an irradiator that emits electromagnetic waves through a lattice-like or net-like protective member; and
a controller that causes the irradiator to irradiate an irradiation target with the electromagnetic waves while causing relative movement between the irradiation target and the irradiator in a first direction, wherein
the protective member is configured or disposed such that no more than one lattice of a plurality of lattices and no more than one node of a plurality of nodes that are formed in the protection member exist in a row along the first direction.

Another mode of the irradiation device according to the present disclosure includes:
an irradiator to which a lattice-like or net-like protective member is attached, the irradiator emitting electromagnetic waves through the protective member; and
a controller that causes the irradiator to irradiate an irradiation target with the electromagnetic waves while causing relative movement between the irradiation target and the irradiator in a first direction, wherein
the protective member is configured or disposed such that passing positions, resulting from relative movement between the irradiation target and the protective member, of lattice intersections and nodes formed in the protective member differ from each other.

Yet another mode of the irradiation device according to the present disclosure includes:
an irradiator to which a lattice-like or net-like protective member is attached, the irradiator emitting electromagnetic waves through the protective member; and
a controller that causes the irradiator to irradiate the irradiation target with the electromagnetic waves while causing relative movement between the irradiation target and the irradiator in a first direction, wherein
the protective member is configured or disposed such that relative movement loci, resulting from relative movement between the irradiation target and the protective member, of lattice intersections and nodes formed in the protective member do not overlap with each other.

One mode of an expansion device according to the present disclosure includes:
a tray on which a thermally expandable sheet is disposed;
an irradiator configured to that irradiate the thermally expandable sheet disposed on the tray with electromagnetic waves; and
a driver that, while the irradiator is being caused to emit the electromagnetic waves, moves the irradiator along the thermally expandable sheet disposed on the tray, thereby causing the thermally expandable sheet to distend; wherein
the irradiator includes a lamp guard provided with a plurality of openings, and
all intersections formed by outer shapes of the plurality of openings do not overlap as viewed in an irradiator movement direction that is a direction of movement of the irradiator caused by the driver.

One mode of a shaping system according to the present disclosure includes:
the expansion device; and
a printing device that prints a conversion layer on the thermally expandable sheet, the conversion layer converting electromagnetic waves into heat; wherein
the expansion device causes the irradiator to irradiate the thermally expandable sheet, on which the conversion layer is printed by the printing device, with electromagnetic waves while moving the irradiator by using the driver, thereby causing the thermally expandable sheet to distend.

BRIEF DESCRIPTION OF THE DRAWINGS

A more complete understanding of this application can be obtained when the following detailed description is considered in conjunction with the following drawings, in which.

DETAILED DESCRIPTION

Figure 1:
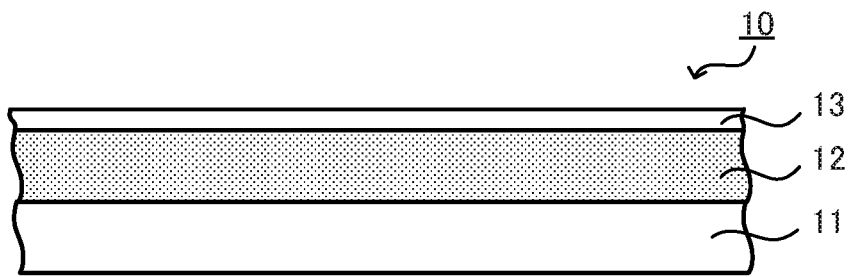
FIG. 1 is a cross-sectional view of a thermally expandable sheet according to an embodiment.

Hereinafter, embodiments are described while referencing the drawings. Note that, in the drawings, identical or corresponding components are marked with the same reference numerals.

In this embodiment, a shaped object is expressed on the front side of a thermally expandable sheet 10 by the bulging of a thermally expansive layer 12. In this application, the term "shaped object" includes a wide range of shapes such as simple shapes, geometrical shapes, characters, and decorations. The term "decorations" refers to objects that appeal to the aesthetic sense through visual and/or tactile sensation. The term "shaped (or molded)" does not simply refer to the forming of a shaped object, but should be construed to also include concepts such as decorating and ornamenting. The term "decorative shaped object" refers to a shaped object formed as a result of decorating or ornamenting.

The shaped object according to the present embodiment uses, as a reference, a particular two-dimensional plane (for example, the XY plane) within three-dimensional space, and includes unevenness in a direction perpendicular (for example, the Z-axis direction) to that plane. This shaped object is an example of a three-dimensional (3D) image, but to distinguish this shaped object from a three-dimensional image produced using a so-called 3D printing technique, the shaped object is called a 2.5-dimensional (2.5D) image or a pseudo-three-dimensional (pseudo-3D) image. Furthermore, the technique for producing this shaped object is an example of a three-dimensional image printing technique, but to distinguish this technique from a so-called 3D printer, the technique is called a 2.5-dimensional (2.5D) printing technique or a pseudo-three-dimensional (pseudo-3D) printing technique.

Thermally Expandable Sheet 10

FIG. 1 illustrates the cross-sectional structure of a thermally expandable sheet 10 for forming the shaped object according to the present embodiment. The thermally expandable sheet 10 is a medium in which a pre-selected portion is heated and thereby distended to form the shaped object.

As illustrated in FIG. 1, the thermally expandable sheet 10 includes, in this order, a base 11, a thermally expansive layer 12, and an ink receiving layer 13. Note that FIG. 1 illustrates a cross-section of the thermally expandable sheet 10 in a state prior to the shaped object being formed or, in other words, in a state in which no portions of the thermally expandable sheet 10 are distended.

The base 11 is a sheet-like medium that becomes the base of the thermally expandable sheet 10. The base 11 is a support body that supports the thermally expansive layer 12 and the ink receiving layer 13, and is responsible for maintaining the strength of the thermally expandable sheet 10. Common printer paper, for example, can be used as the base 11. However the material of the base 11 is not particularly limited and examples thereof include synthetic paper, canvas and similar fabrics, and plastic films such as polypropylene, polyethylene terephthalate (PET), and polybutylene terephthalate (PBT).

The thermally expansive layer 12 is disposed on the top side of the base 11, and is a layer that distends as a result of being heated to a certain temperature or higher. The thermally expansive layer 12 includes a binder and a thermally expandable material dispersed in the binder. The binder is a thermoplastic resin such as ethylene-vinyl-acetate polymer or acrylic polymer. Specifically, the thermally expandable material comprises thermally expandable microcapsules (micropowder) having a particle size of about 5 to 50 μm. These microcapsules are formed by encapsulating, in a thermoplastic resin shell, a substance that vaporizes at a low boiling point such as propane or butane. When the thermally expandable material is heated to a temperature of about 80° C. to 120° C., for example, the encapsulated substance vaporizes, and the resulting pressure causes the thermally expandable agent to foam and distend. Thus, the thermally expansive layer 12 distends according to the amount of heat absorbed. The thermally expandable material is also called a foaming agent.

The ink receiving layer 13 is a layer that is disposed on the top side of the thermally expansive layer 12 and that absorbs and receives ink. The ink receiving layer 13 receives printer ink used in ink jet printers, printer toner used in laser printers, inks of ballpoint pens, fountain pens, and the like, graphite of pencils, and the like. The ink receiving layer 13 is formed from a material suitable for holding these inks and the like on the surface of the ink receiving layer 103. A material typically used for ink jet paper, for example, can be used as the material of the ink receiving layer 13.

Figure 2:
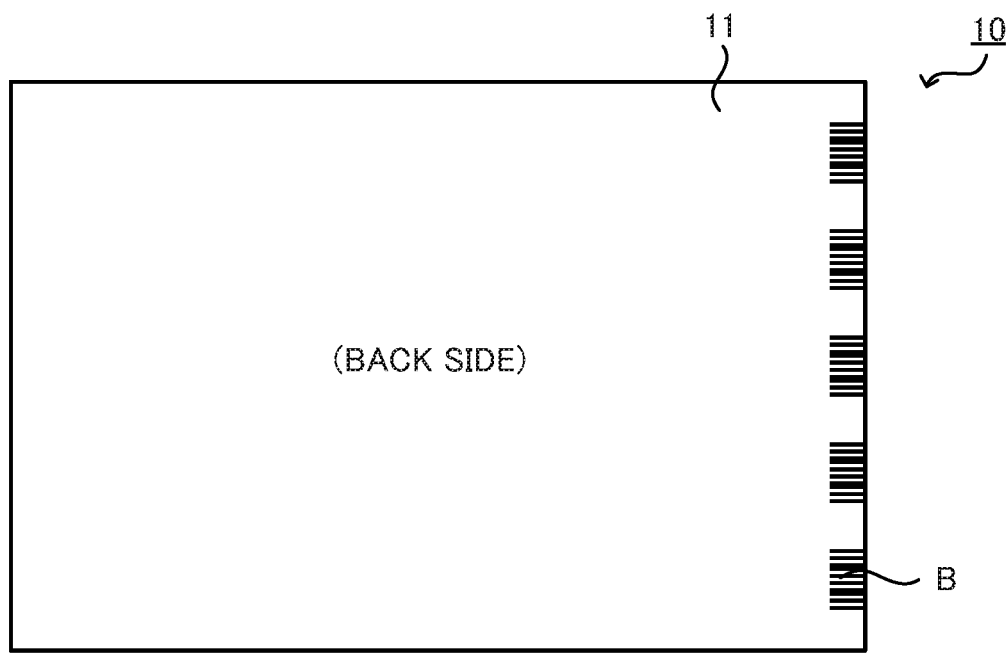
FIG. 2 is a drawing illustrating the back side of the thermally expandable sheet illustrated in FIG. 1.

FIG. 2 is a drawing illustrating the back side of the thermally expandable sheet 10. The back side of the thermally expandable sheet 10 is the surface of the thermally expandable sheet 10 on the base 11 side, and corresponds to the back side of the base 11.

As illustrated in FIG. 2, a plurality of barcodes B are affixed along the periphery of the back side of the thermally expandable sheet 10. The barcodes B are identifiers for identifying the thermally expandable sheet 10, and indicate that the thermally expandable sheet 10 is a dedicated sheet for forming the shaped object. The barcodes B are read by an expansion device 50 and are used to determine whether the thermally expandable sheet 10 can be used in the expansion device 50.

A shaping system 1 can form the shaped object on the thermally expandable sheet 10 described above. Carbon molecules are printed on the portion of the front side or the back side of the thermally expandable sheet 10 where the thermally expansive layer 12 is to be caused to distend. The carbon particles are contained in a black (carbon black) ink or an ink of another color, and constitute a type of electromagnetic wave heat conversion material (exothermic agent) that absorbs and converts electromagnetic waves to heat. The carbon molecules absorb electromagnetic waves and thermally vibrate, thereby generating heat. When the portion of the thermally expandable sheet 10 where the carbon molecules have been printed is heated, the corresponding portion of the thermally expansive layer 12 distends and bumps are formed. A protruding or uneven shape is formed by the bumps of the thermally expansive layer 12 and, as a result, the shaped object is formed in the thermally expandable sheet 10.

In the thermally expandable sheet 10, a variety of shaped objects can be obtained by combining the locations where and the heights to which the thermally expansive layer 12 is caused to distend. Additionally, a greater variety of shaped objects can be obtained by subjecting the thermally expandable sheet 10 to color printing.

Shaping System 1

Figure 3:
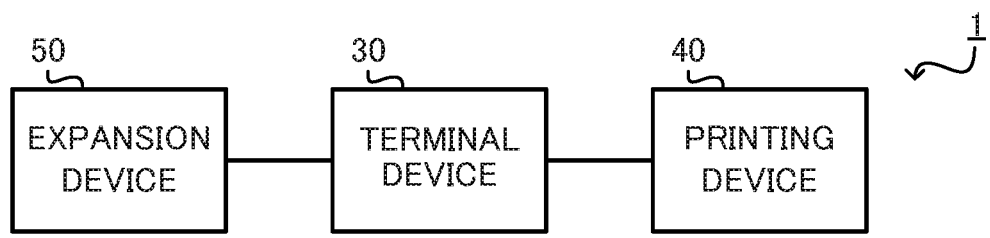
FIG. 3 is a drawing illustrating a schematic configuration of a shaping system according to an embodiment.

Next, while referencing FIG. 3, a description will be given of the shaping system 1 that forms the shaped object on the thermally expandable sheet 10. As illustrated in FIG. 3, the shaping system 1 includes a terminal device 30, a printing device 40, and an expansion device 50.

Figure 4:
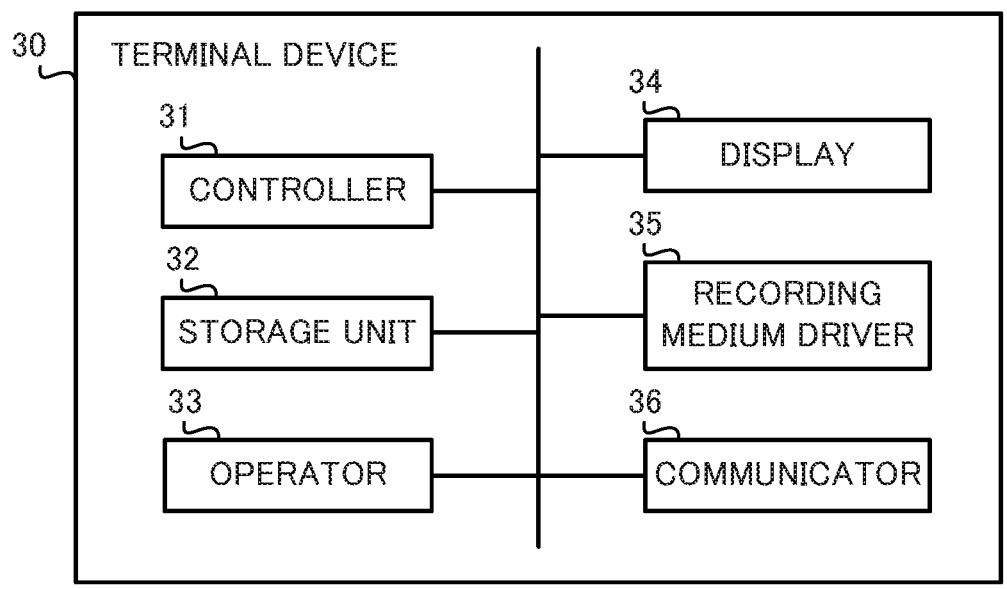
FIG. 4 is a block diagram illustrating the configuration of a terminal device according to an embodiment.

The terminal device 30 is an information processing device such as a personal computer, a smartphone, or a tablet, and is a control unit that controls the printing device 40 and the expansion device 50. As illustrated in FIG. 4, the terminal device 30 includes a controller 31, a storage unit 32, an operator 33, a display 34, a recording medium driver 35, and a communicator 36. Each of these units is connected to a bus for transmitting signals.

The controller 31 includes a central processing unit (CPU), read only memory (ROM), and random access memory (RAM). In the controller 31, the CPU reads a control program stored in the ROM and controls the operations of the entire terminal device 30 while using the RAM as working memory.

The storage unit 32 is nonvolatile memory such as flash memory or a hard disk. Data and programs to be executed by the controller 31 are stored in the storage unit 32. Additionally, color image data, front side foaming data, and back side foaming data to be printed by the printing device 40 are stored in the storage unit 32.

The operator 33 includes an input device such as a keyboard, a mouse, buttons, a touch pad, and a touch panel, and receives operations from the user. By operating the operator 33, the user can input operations for editing the color image data, the front side foaming data, or the back side foaming data; operations for the printing device 40 or the expansion device 50; or the like.

The display 34 includes a display device such as a liquid crystal display or an organic electro luminescence (EL) display, and a display driving circuit that causes images to be displayed on the display device. In one example, the display 34 displays the color image data, the front side foaming data, and the back side foaming data. Additionally, as desired, the display 34 may display information indicating the current state of the printing device 40 or the current state of the expansion device 50.

The recording medium driver 35 reads programs or data stored in a portable recording medium. Examples of the portable recording medium include a compact disc (CD) ROM, a digital versatile disc (DVD) ROM, and flash memory provided with a universal serial bus (USB) standard connector. In one example, the recording medium driver 35 reads and acquires the color image data, the front side foaming data, and the back side foaming data from the portable recording medium.

The communicator 36 includes an interface for communicating with external devices, including the printing device 40 and the expansion device 50. The terminal device 30 is connected to the printing device 40 and the expansion device 50 via a wire such as a flexible cable or a wired local area network (LAN) or is wirelessly connected to the printing device 40 and the expansion device 50 via a wireless LAN, Bluetooth (registered trademark), or the like. The communicator 36 communicates with the printing device 40 and the expansion device 50 in accordance with at least one of these communication protocols under the control of the controller 31.

Printing Device 40

The printing device 40 is a printing unit that prints images on the front side or the back side of the thermally expandable sheet 10. In one example, the printing device 40 is an ink jet printer that prints images via a method in which ink is micronized and directly sprayed on print media.

Figure 5:
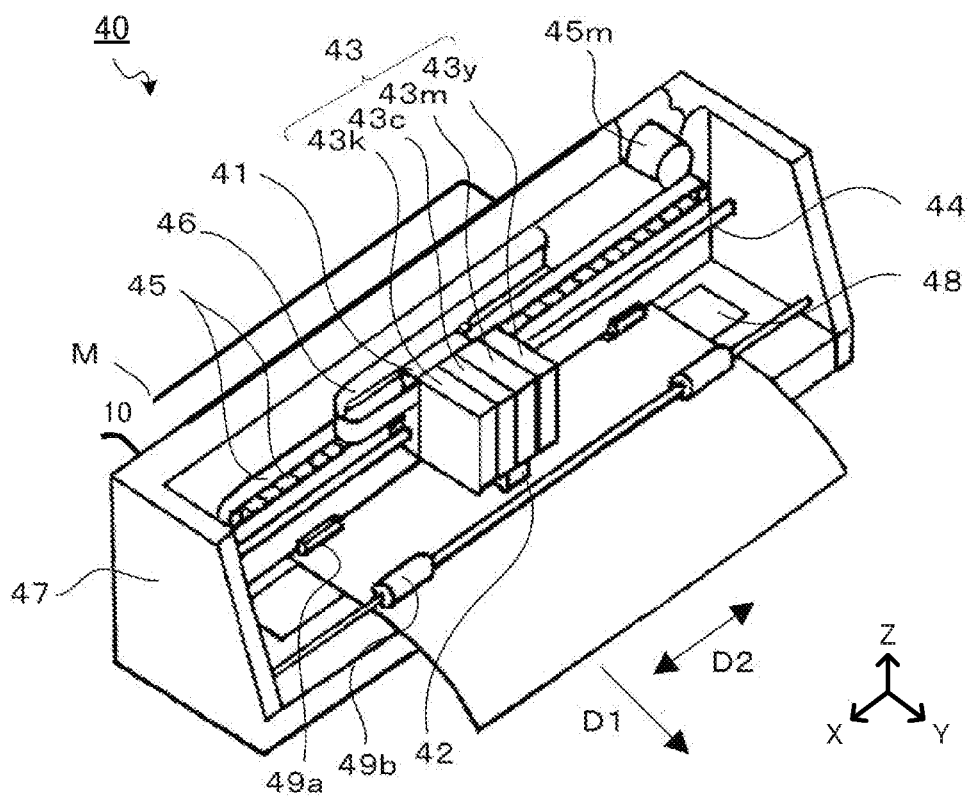
FIG. 5 is a perspective view illustrating the configuration of a printing device according to an embodiment.

FIG. 5 illustrates the detailed configuration of the printing device 40. As illustrated in FIG. 5, the printing device 40 includes a carriage 41 capable of reciprocating movement in a main scanning direction D2 (the X-direction), which is orthogonal to a sub scanning direction D1 (the Y-direction). The sub scanning direction D1 is the direction in which the thermally expandable sheet 10 is transported.

A print head 42 that executes the printing and ink cartridges 43 (43k, 43c, 43m, and 43y) containing ink are attached to the carriage 41. The ink cartridges 43k, 43c, 43m, and 43y respectively contain black (K), cyan (C), magenta (M), and yellow (Y) color ink. Each color of ink is discharged from a corresponding nozzle of the print head 42.

The carriage 41 is supported slidably on a guide rail 44, and is sandwiched between drive belts 45. The drive belts 45 are driven by the rotation of a motor 45m and, as a result, the carriage 41 moves in the main scanning direction D2 together with the print head 42 and the ink cartridges 43.

A platen 48 is provided in a lower portion of a frame 47, at a position facing the print head 42. The platen 48 extends in the main scanning direction D2 and constitutes a portion of a transport path of the thermally expandable sheet 10. A pair of feed rollers 49a (lower roller not illustrated in the drawings) and a pair of discharge rollers 49b (lower roller not illustrated in the drawings) are provided on the transport path of the thermally expandable sheet 10. The pair of feed rollers 49a and the pair of discharge rollers 49b transport the thermally expandable sheet 10, supported by the platen 48, in the sub scanning direction D1.

The printing device 40 is connected to the terminal device 30 via a flexible communication cable 46. The terminal device 30 controls the print head 42, the motor 45m, the pair of feed rollers 49a, and the pair of discharge rollers 49b via the flexible communication cable 46. Specifically, the terminal device 30 controls the pair of feed rollers 49a and the pair of discharge rollers 49b to transport the thermally expandable sheet 10. Additionally, the terminal device 30 causes the motor 45*m* to rotate, thereby moving the carriage 41 and transporting the print head 42 to an appropriate position in the main scanning direction D2.

The printing device 40 acquires the image data from the terminal device 30 and executes printing on the basis of the acquired image data. Specifically, the printing device 40 acquires the color image data, the front side foaming data, and the back side foaming data as the image data. The color image data is data that represents a color image to be printed on the front side of the thermally expandable sheet 10. The printing device 40 causes the print head 42 to spray cyan (C), magenta (M), and yellow (Y) inks toward the thermally expandable sheet 10 to print the color image.

The front side foaming data is data that indicates the portion of the front side of the thermally expandable sheet 10 to be foamed and caused to swell. The back side foaming data is data that indicates the portion of the back side of the thermally expandable sheet 10 to be foamed and caused to swell. The printing device 40 causes the print head 42 to spray black (K) ink that contains carbon black toward the thermally expandable sheet 10 to print a gray-scale image (gray-scale pattern, heat conversion layer) using this black ink. The carbon black-containing black ink is an example of the material that converts electromagnetic waves to heat.

Expansion Device 50

The expansion device 50 is an expansion unit that causes the portion of the thermally expandable sheet 10 where the heat conversion layer is printed to distend by irradiating the front side or the back side of the thermally expandable sheet 10 with electromagnetic waves and causing the heat conversion layer printed on the front side or the back side of the thermally expandable sheet 10 to generate heat.

Figure 6:
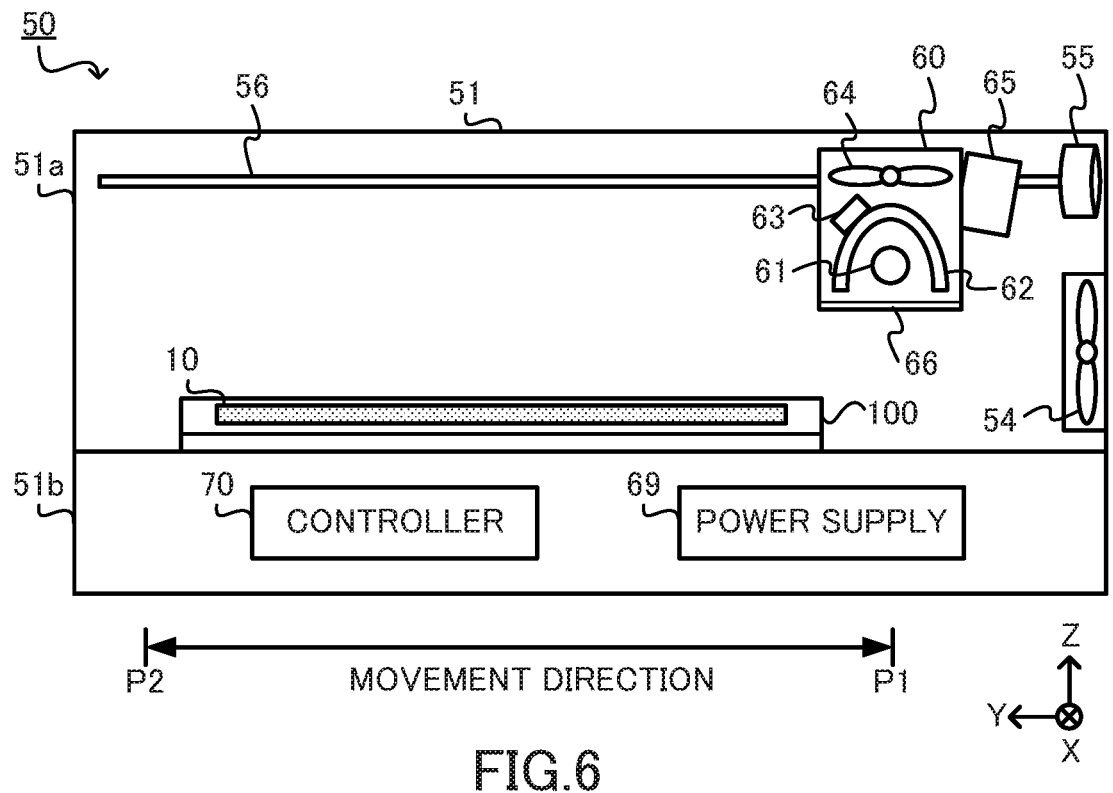
FIG. 6 is a cross-sectional view schematically illustrating the configuration of an expansion device according to an embodiment.

FIG. 6 schematically illustrates the configuration of the expansion device 50. In FIG. 6, the X-direction corresponds to the width direction of the expansion device 50, the Y-direction corresponds to the longitudinal direction of the expansion device 50, and the Z-direction corresponds to the vertical direction. The X-direction, the Y-direction, and the Z-direction are orthogonal to each other.

The expansion device 50 moves the irradiator 60 and, simultaneously, causes the irradiator 60 to irradiate the thermally expandable sheet 10 mounted on a tray 100 with electromagnetic waves, thereby causing the thermally expandable sheet 10 to distend. The irradiator 60 moves back and forth between a first position P1 and a second position P2. The first position P1 is the initial position (home position) of the irradiator 60. The irradiator 60 stands by at the first position P1 when the expansion device 50 is not operating.

The expansion device 50 includes a box-shaped housing 51. The interior of the housing 51 is partitioned into two sections, namely an upper housing 51*a* and a lower housing 51*b*. The temperature in the upper housing 51*a* rises due to the irradiation of the electromagnetic waves from the irradiator 60. However, the configuration described above suppresses the impact of such temperature rises on the substrates and other components in the lower housing 51*b*. The expansion device 50 includes, in the upper housing 51*a*, a ventilator 54, a transportation motor 55, a transportation rail 56, the irradiator 60, and the tray 100. The expansion device 50 includes, in the lower housing 51*b*, a power supply 69 and a controller 70.

The tray 100 is a mechanism for setting the thermally expandable sheet 10 at an appropriate position in the housing 51. The periphery of the thermally expandable sheet 10 is pressed down by an auxiliary member and a pressing member of the tray 100 to fix the thermally expandable sheet 10 to the tray 100. As a result, deformation of the thermally expandable sheet 10 is suppressed. The expansion processing is executed while the thermally expandable sheet 10 is securely fixed to the tray 100.

When the thermally expandable sheet 10 is mounted on the tray 100, the user feeds the tray 100 into the machine by sliding the tray 100 in the +X direction. As a result, the thermally expandable sheet 10 is disposed at a position where the thermally expandable sheet 10 can be irradiated with electromagnetic waves by the irradiator 60. Thereafter, when the expansion processing of the thermally expandable sheet 10 is completed, the user pulls the tray 100 out in the −X direction and removes the thermally expandable sheet 10 from the tray 100.

Next, further description is given of the expansion device 50 illustrated in FIG. 6. The irradiator 60 is a mechanism that irradiates electromagnetic waves toward the thermally expandable sheet 10 disposed on the tray 100. As illustrated in FIG. 6, the irradiator 60 includes, inside a box-like cover, a lamp heater 61, a reflection plate 62, a temperature sensor 63, a cooler 64, and a lamp guard 66.

In one example, the lamp heater (lamp) 61 includes a halogen lamp as an irradiation source and irradiates, as electromagnetic waves, light in the near-infrared region (750 to 1400 nm wavelength range), the visible light spectrum (380 to 750 nm wavelength range), or the intermediate infrared region (1400 to 4000 nm wavelength range) at the thermally expandable sheet 10. The irradiator 60 and the lamp heater 61 irradiate light in such wavelength ranges and, as such, function as irradiating devices that irradiate the thermally expandable sheet 10 with energy.

When the thermally expandable sheet 10, on which the heat conversion layer (gray-scale image, conversion layer) formed from the carbon black-containing black ink is printed, is irradiated with light (energy), the portions where the heat conversion layer is printed convert the light to heat more efficiently than the portions where the heat conversion layer is not printed. As such, the portions of the thermally expandable sheet 10 where the heat conversion layer is printed are mainly heated and, when the thermally expandable material reaches the temperature at which expansion begins, these portions distend. The irradiator 60 irradiates light (energy) while being transported by the transportation motor 55 and, as such, the irradiator 60 functions as a thermal expander that causes the thermally expandable sheet 10 to thermally expand. Note that, the light irradiated by the lamp heater 61 is not limited to light in the wavelength ranges described above and, provided that the light is electromagnetic waves, may be of any wavelength range.

The reflection plate 62 is disposed so as to cover the top side of the lamp heater 61, and is a mechanism that reflects the light irradiated from the lamp heater 61 toward the thermally expandable sheet 10. As a result of this configuration, light irradiated in directions other than that of the thermally expandable sheet 10 can also be directed at the thermally expandable sheet 10 and, therefore, energy loss can be reduced. Moreover, light from directions other than that of the lamp heater 61 can be irradiated and, therefore, uneven irradiation of the thermally expandable sheet 10 can be reduced. The temperature sensor 63 is a thermocouple, a thermistor or the like, and functions as a measuring device that measures the temperature of the reflection plate 62. The cooler 64 includes at least one fan for supplying air to the irradiator 60. The cooler 64 cools by intaking outside air and supplying that outside air to the reflection plate 62. The outside air supplied to the reflection plate 62 flows farther downward, thereby cooling the interior of the housing 51 and the irradiator 60.

The ventilator 54 is provided at the far side end of the expansion device 50, and ventilates the interior of the expansion device 50. The ventilator 54 includes at least one fan, and ventilates the interior of the housing 51 by exhausting the air in the housing 51 out of the housing 51.

In one example, the transportation motor 55 is a stepping motor that operates in synchronization with pulse power, and causes the irradiator 60 to move along the thermally expandable sheet 10 that is mounted on the tray 100. The transportation rail 56 is provided in the housing 51 in the Y-direction, that is, in a direction parallel to the front side or the back side of the thermally expandable sheet 10 that is mounted on the tray 100. The irradiator 60 is attached to the transportation rail 56 so as to be capable of moving along the transportation rail 56. The transportation motor 55 rotates due to the clockwise or counter-clockwise (when viewed in the axial direction) rotational speed of the transportation motor 55, which is controlled on the basis of commands from the controller 70. The irradiator 60 uses the driving force that is generated from the rotation of the transportation motor 55 as a power source to move back and forth along the transportation rail 56 while maintaining a certain distance from the thermally expandable sheet 10. The transportation motor 55 functions as a driver (driving device) that moves the irradiator 60 along the thermally expandable sheet 10.

Figure 7:
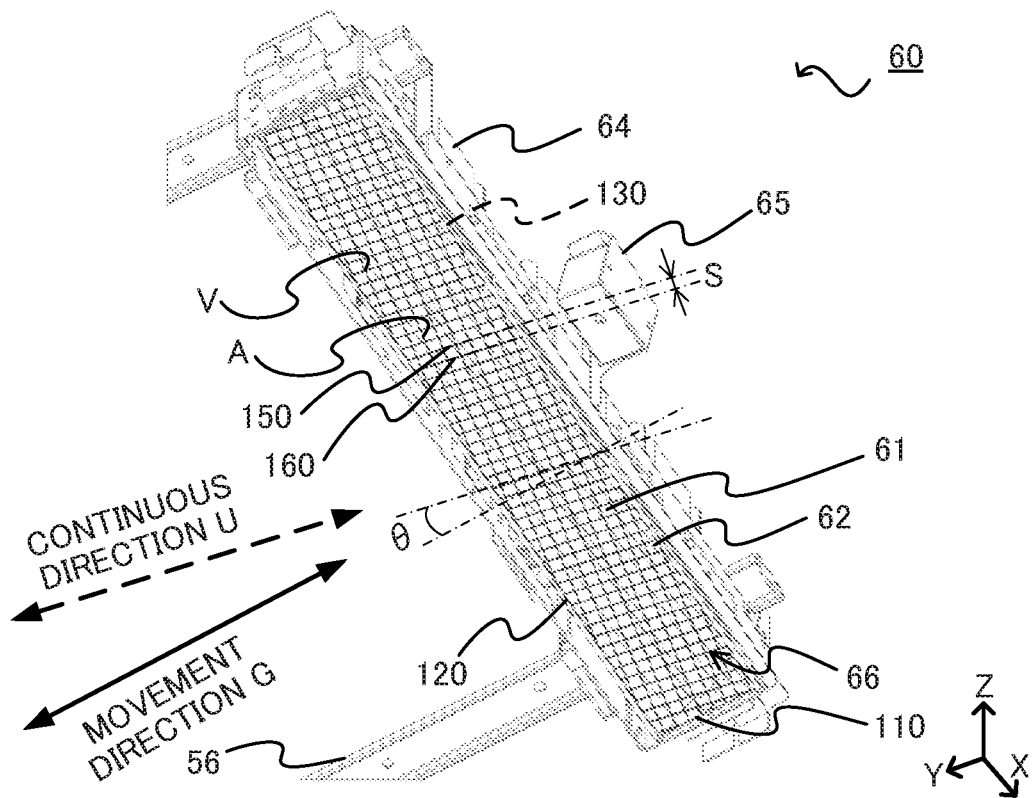
FIG. 7 is a perspective view illustrating the configuration of a lamp guard of an irradiator of the expansion device according to an embodiment.
Figure 9:
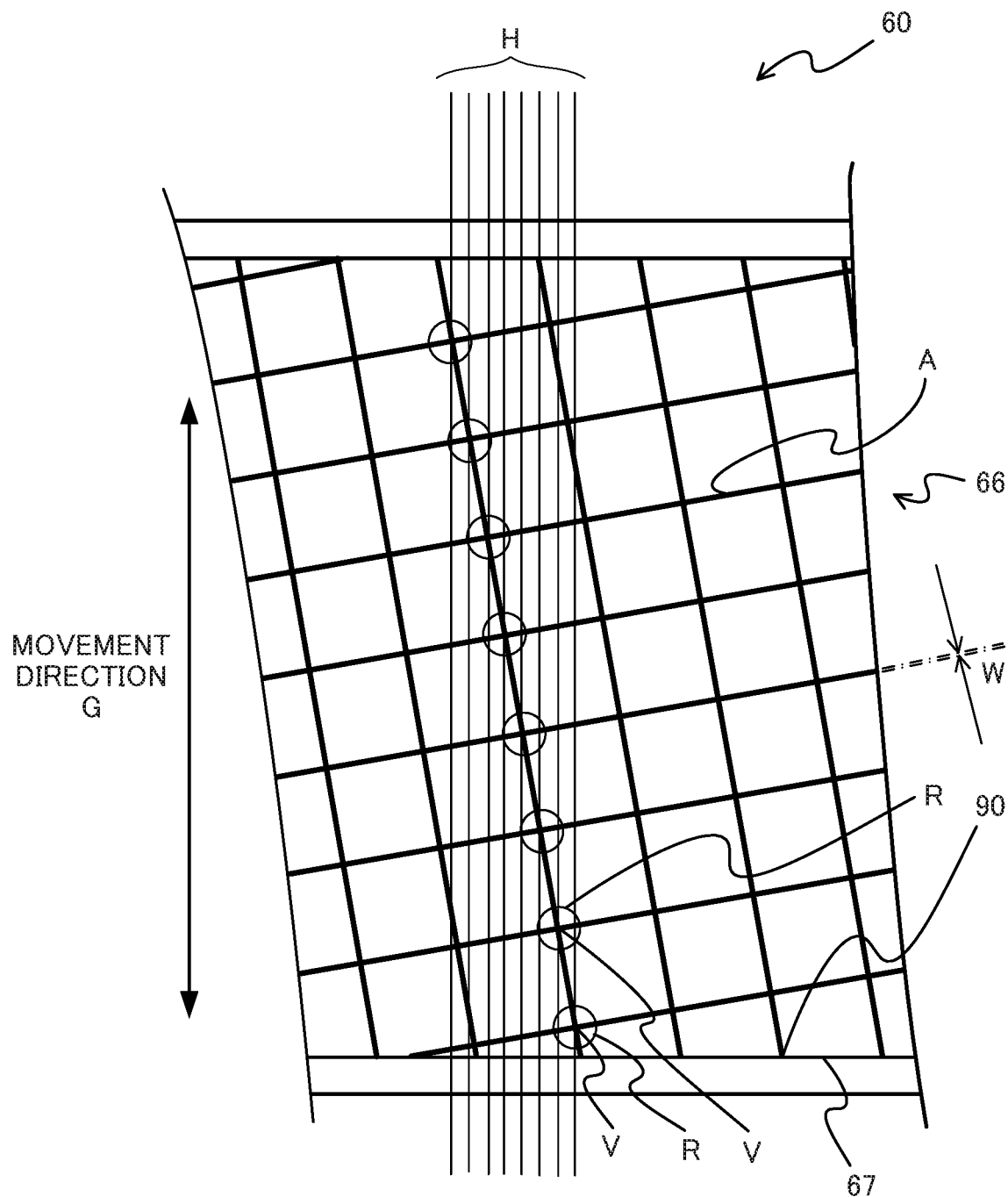
FIG. 9 is a drawing illustrating the positional relationships of intersections defined by the openings of the lamp guard.

As illustrated in FIG. 7, the lamp guard 66 is a mesh-like (net-like, lattice-like) protective member that is made from metal and that has a rectangular outer shape. The lamp guard 66 is provided at an opening portion of the reflection plate 62. The reflection plate 62 and the lamp guard 66 surround the lamp heater 61. The lamp guard 66 reduces the possibility of the light source lamp becoming damaged, smoking, or the like due to a thermally expandable sheet, which has become warped or deformed, coming into contact with the light source lamp. The shape of openings A, which are defined by the mesh-like lattice of the lamp guard 66, is square. Note that, the shape of the openings A positioned on the periphery of the lamp guard 66 is not limited to being square. For example, as illustrated in FIG. 9, the openings A positioned on the periphery of the lamp guard 66 may have partial square shape. The direction in which the openings A of the lamp guard 66 are continuous, namely an opening continuous direction (continuous direction) U has a predetermined angle $\theta$ (where $0°<\theta<45°$) with respect to the direction in which the transportation motor 55 moves the irradiator 60, namely an irradiator movement direction (movement direction) G.

The power supply 69 includes a power supply integrated circuit (IC) and the like, and produces and supplies the necessary power to the various components in the expansion device 50. For example, the ventilator 54, the transportation motor 55, the lamp heater 61, and the cooler 64 receive power from the power supply 69 to operate.

The controller 70 is provided on a substrate disposed in the lower portion of the housing 51. The controller 70 includes a processor such as a CPU, and memory such as ROM and RAM. The controller 70 is connected to the various components of the expansion device 50 via transmission paths, that is, a system bus that transmits commands and data. Additionally, while not illustrated in the drawings, the controller 70 includes nonvolatile memory such as flash memory or a hard disk, a timekeeping device such as a real time clock (RTC), and a communication interface for communicating with the terminal device 30.

In the controller 70, the CPU reads a control program stored in the ROM and controls the operations of the entire expansion device 50 while using the RAM as working memory. Specifically, the controller 70 controls the transportation motor 55 to move the irradiator 60 in a specified direction, namely the movement direction G, at a specified movement speed. Moreover, the controller 70 switches the irradiation of the electromagnetic waves by the irradiator 60 ON and OFF, and causes the barcode reader 65 to read the barcodes B.

The barcode reader 65 functions as a reader (reading device) that reads the barcodes B provided on the periphery of the thermally expandable sheet 10. The barcode reader 65 includes a light source that emits light and an optical sensor that detects light. The barcode reader 65 optically reads the barcodes B by a laser method or similar well-known method. The barcode reader 65 is attached to the outside of the cover of the irradiator 60, and optically reads the barcodes B while moving together with the irradiator 60 along the thermally expandable sheet 10 mounted on the tray 100.

The barcodes B are provided on the periphery of one side of the thermally expandable sheet 10. Meanwhile, when the thermally expandable sheet 10 is mounted on the tray 100 and pressing member is closed, the pressing member is overlaid on at least the peripheries of three sides of the thermally expandable sheet 10, including the one side where the barcodes B are provided. Moreover, the pressing member presses down on the peripheries of the at least three sides. In order to prevent the barcodes B from being concealed by the pressing member and making it impossible to read the barcodes B, openings are provided in the pressing member through which the barcode reader 65 can read the barcodes B.

Expansion Processing

The controller 70 causes the irradiator 60 to irradiate the thermally expandable sheet 10, on which the heat conversion layer is printed by the printing device 40, with electromagnetic waves, thereby causing the thermally expandable sheet 10 to distend.

Figure 8:
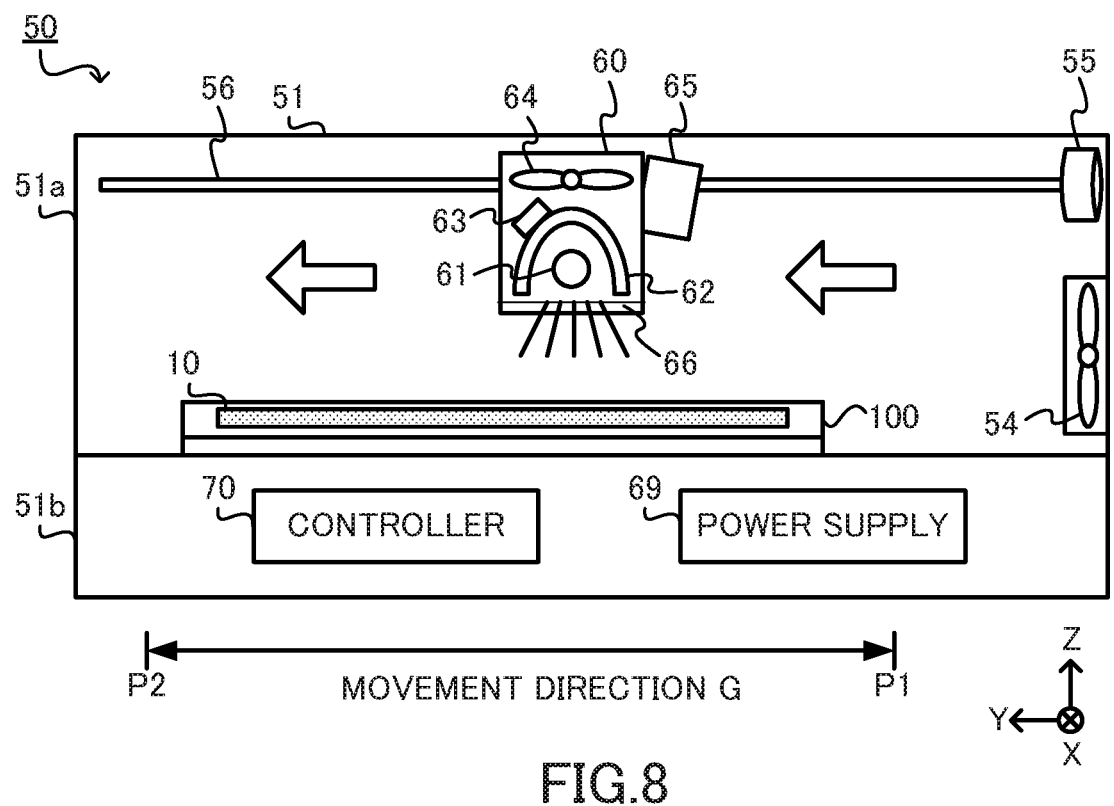
FIG. 8 is a drawing illustrating expansion processing performed in the expansion device illustrated in FIG. 6.

FIG. 8 illustrates the execution of the expansion processing by the expansion device 50. When the barcodes B provided on the thermally expandable sheet 10 mounted on the tray 100 are read by the barcode reader 65, the controller 70 supplies power supply voltage to the irradiator 60 and causes the lamp heater 61 to turn ON. Then, the controller 70 causes the irradiator 60 to irradiate electromagnetic waves and, simultaneously, causes the transportation motor 55 to drive. As a result, the controller 70 causes the irradiator 60 to move a specified distance from the first position P1 in a direction toward the second position P2 (the first direction, the predetermined direction). Thus, the controller 70 causes the irradiator 60 to move from one edge of the thermally expandable sheet 10 to the other edge of the thermally expandable sheet 10 and, as such, causes the front side or back side of the thermally expandable sheet 10 to be thoroughly irradiated with electromagnetic waves.

The specified distance is determined depending on the size of the thermally expandable sheet 10. In one example, when the size of the thermally expandable sheet 10 is A3 (297 mm×420 mm), the specified distance is the distance from the first position P1 to the second position P2. In contrast, when the size of the thermally expandable sheet 10 is A4 (210 mm×297 mm), the specified distance is half the distance from the first position P1 to the second position P2.

When the electromagnetic waves are irradiated by the irradiator 60, the portions of the thermally expandable sheet 10, where the heat conversion layer is printed using the carbon black-containing black ink, generate heat. The thermally expandable material in the thermally expansive layer 12 distends when heated to the expansion starting temperature. As a result, the thermally expansive layer 12 bulges.

The expansion starting temperature differs depending on the thermally expandable material, and is the temperature at which the thermally expandable material starts to expand. In one example, the expansion starting temperature is about 80° C. to about 120° C. The controller 70 causes the irradiator 60, which is irradiating electromagnetic waves at a predetermined intensity, to move at a predetermined speed, thereby heating the portions of the thermally expandable sheet 10 where the heat conversion layer is printed. The predetermined intensity and the predetermined speed are set in advance so as to enable heating of the thermally expandable material in the thermally expansive layer 12 to the expansion starting temperature or higher.

Thus, the controller 70 causes the irradiator 60 to move in the first direction by the transportation motor 55 and, simultaneously, causes the irradiator 60 to irradiate electromagnetic waves. As a result, the thermally expansive layer 12 of the thermally expandable sheet 10 distends. The portions of the thermally expandable sheet 10 where the heat conversion layer is printed distend to heights corresponding to the concentration of the black color of the heat conversion layer. As a result, the desired shaped object is formed on the thermally expandable sheet 10.

Since the lamp guard 66 is attached to the irradiator 60, the arriving electromagnetic waves, at points on the thermally expandable sheet 10 directly below the intersections (lattice intersections or nodes) V of the mesh-like lattice of the lamp guard 66, may decrease and uneven irradiation may occur. Here, the intersections V are also referred to as intersections defined by openings A.

In the present embodiment, in order to reduce uneven irradiation, in the lamp guard 66, the direction in which the openings A are continuous, namely the continuous direction U, has a predetermined angle θ with respect to the movement direction of the irradiator 60, namely the irradiator movement direction G. As a result of this configuration, when viewed from the movement direction G, all of the intersections V of the lamp guard 66 are separated from each other (do not overlap) as illustrated by surrounding the intersections V by the circles R on the narrow lines H in FIG. 9. The narrow lines H illustrated in FIG. 9 are parallel to the movement direction G, and each passes through one of the intersections V. In other words, the lamp guard 66 is configured or disposed such that no more than one intersection V formed in the lamp guard 66 exists in the same row in the movement direction G. The lamp guard 66 can also be said to be parallel to the movement direction G, and configured or disposed such that there are no other intersections V positioned on a narrow line H that passes through any given intersection (that is, each narrow line H only passes through one intersection V).

Figure 10:
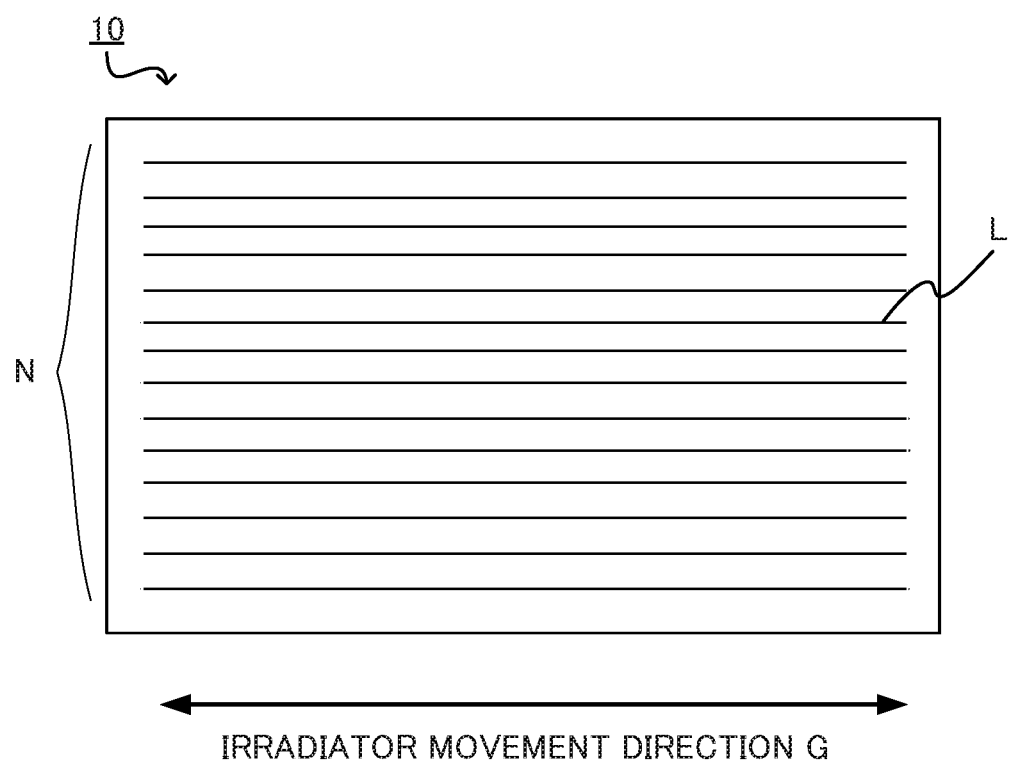
FIG. 10 is a drawing illustrating loci, on the thermally expandable sheet, of the intersections defined by the openings of the lamp guard.

The lamp guard 66 can also be said to be configured or disposed such that the passing positions, resulting from the movement of the irradiator 60, of the intersections V formed in the lamp guard 66 differ for each intersection V. As a result of this configuration, as illustrated in FIG. 10, the loci L of a total number N of the intersections V formed by the outer shapes of the openings A become a total number N of straight lines extending in the irradiator movement direction G on the thermally expandable sheet 10 without overlapping. In other words, the number of times an intersection V passes directly above any position on the thermally expandable sheet 10 over which the lamp guard 66 can pass is one or less. Accordingly, reductions in the arrival of the electromagnetic waves on the thermally expandable sheet 10 caused by the passing of the intersections V defined by the openings A of the mesh can be suppressed, and uneven irradiation can be reduced. Note that termination points 90 formed by the outer frame of the lamp guard 66 and the openings A are not included in the intersections V.

Figure 11A:
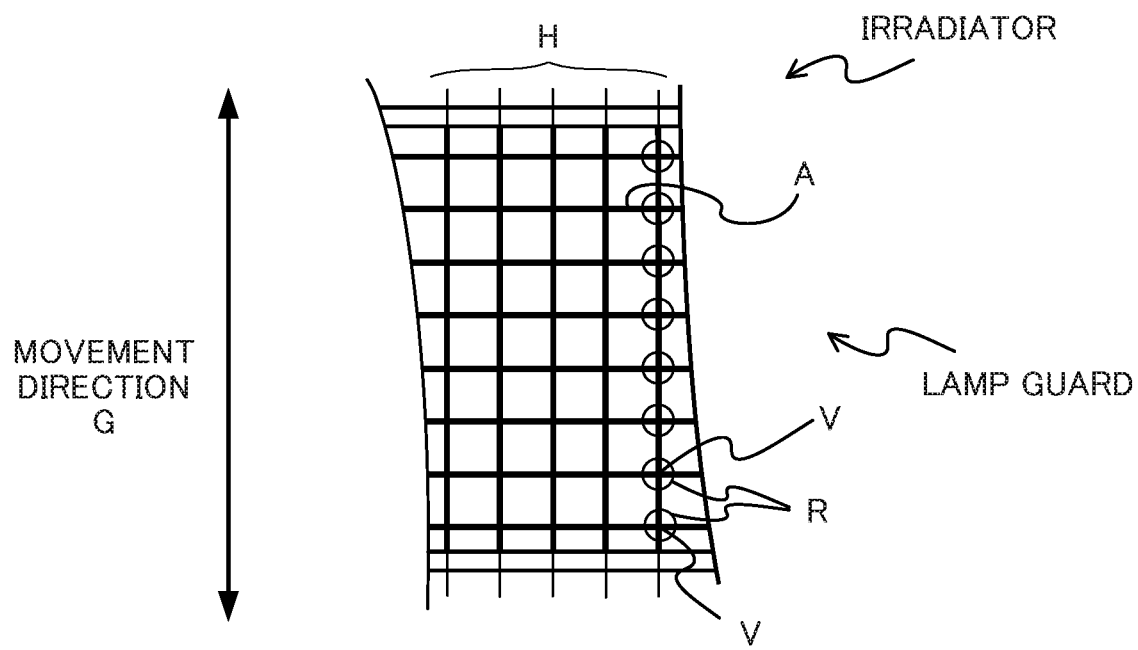
FIG. 11A is a drawing illustrating the positional relationships of the intersections defined by the openings of the lamp guard, where θ=0°.
Figure 11B:
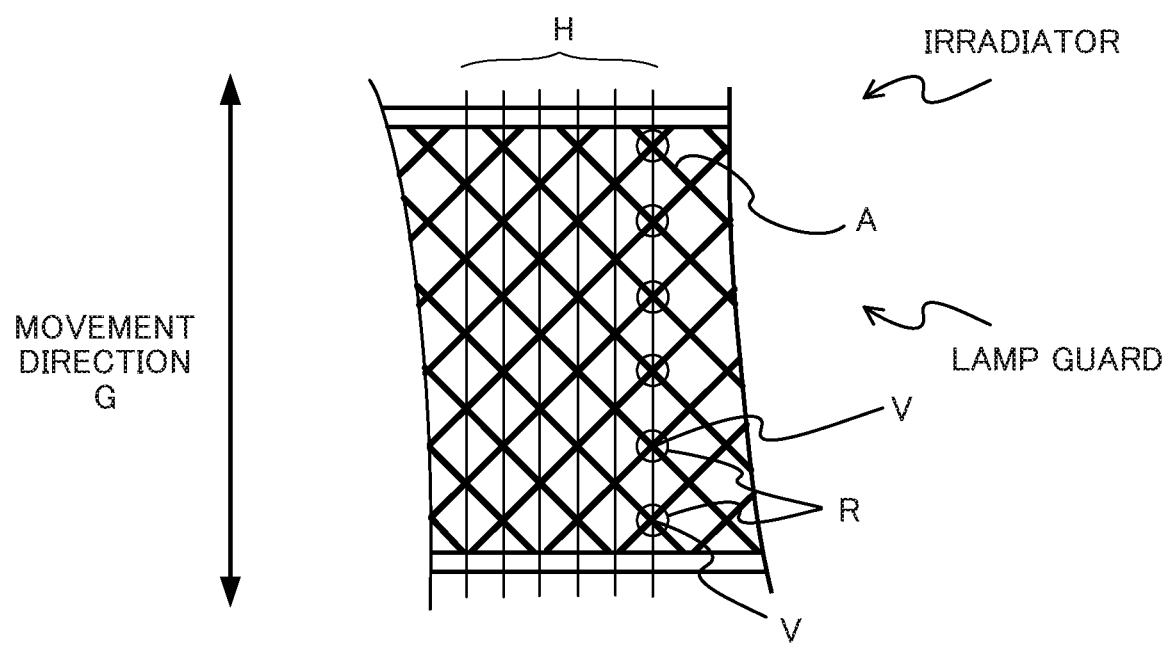
FIG. 11B is a drawing illustrating the positional relationships of the intersections defined by the openings of the lamp guard, where θ=45°.

Note that, when θ=0° (illustrated in FIG. 11A) and when θ=45° (illustrated in FIG. 11B), when viewed from the movement direction G, some of the intersections V overlap with other intersections V (one narrow line H passes through a plurality of intersections V at the positions surrounded by the circles R). In these cases, the number of times an intersection V passes directly above some positions on the thermally expandable sheet 10 is two or greater, and this leads to an increase in uneven irradiation. Therefore, in the present embodiment, θ is set so that 0°<θ<45°. Moreover, the width W of the lattice defined by the openings A, illustrated in FIG. 9, is constant.

The irradiator 60 arrives at the edge on the second position P2 side of the thermally expandable sheet 10 as a result of this expansion processing. After the expansion processing is executed, while not illustrated in the drawings, the controller 70 causes the irradiator 60 to move in a direction (second direction) from the second position P2 toward the first position P1 or, in other words, returns the irradiator 60 to the home position and, at the same time, as necessary, executes ventilation processing by the ventilator 54 or cooling processing by the cooler 64. Specifically, the controller 70 causes the ventilator 54 to drive, thereby exhausting the air in the housing 51, which is heated by the expansion processing, out of the housing 51. Additionally, the controller 70 causes the cooler 64 to drive, thereby cooling the irradiator 60 and the thermally expandable sheet 10, which are heated by the expansion processing.

Figure 12:
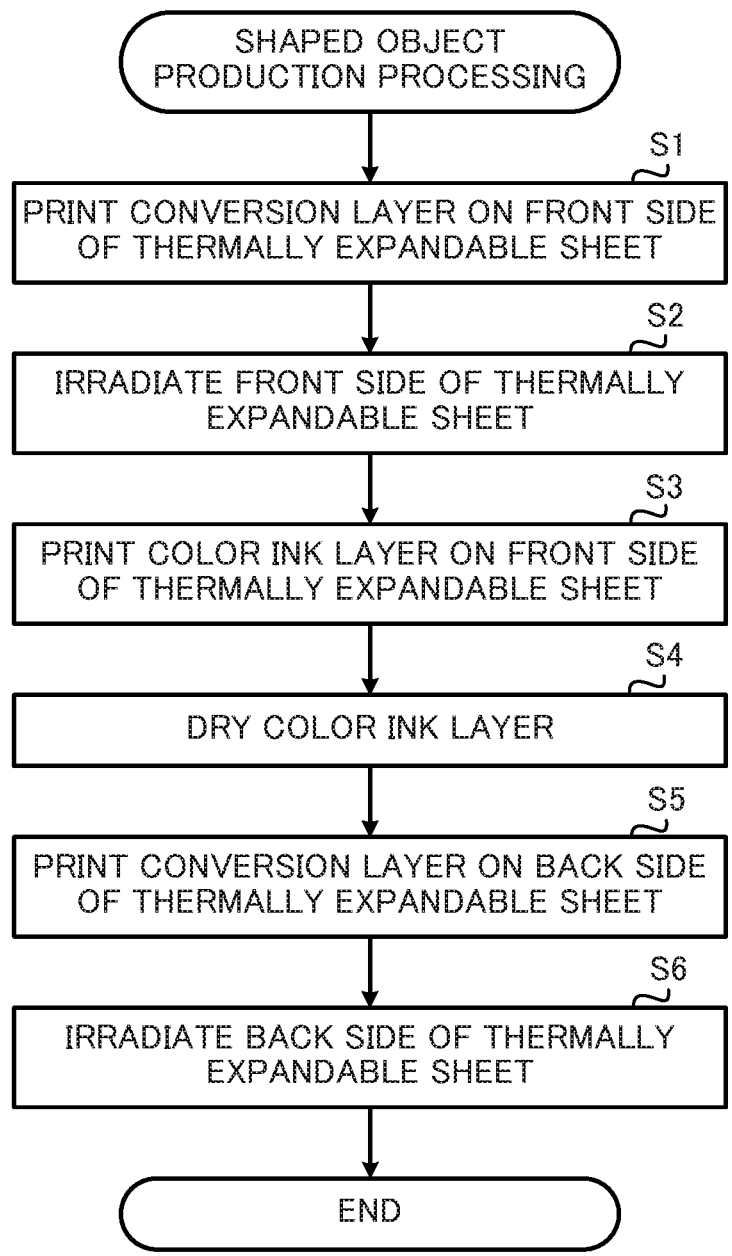
FIG. 12 is a flowchart illustrating the flow of production processing of a shaped object, executed by the shaping system according to an embodiment.

Next, a description will be given of the flow of the production processing of the shaped object executed by the printing device 40 and the expansion device 50 while referencing the flowchart illustrated in FIG. 12 and the cross-sectional views of the thermally expandable sheet 10 illustrated in FIGS. 13A to 13E.

Figure 13A:
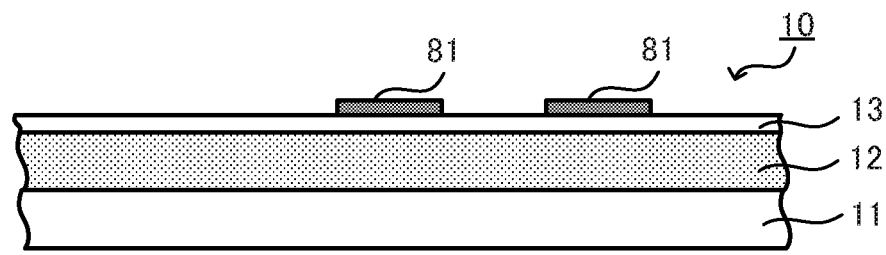
FIGS. 13A to 13E are drawings illustrating, in steps, the production of the shaped object on the thermally expandable sheet, illustrated in FIG. 12.

First, a user prepares a thermally expandable sheet 10 on which a shaped object has not been produced, and designates the color image data, the front side foaming data, and the back side foaming data using the terminal device 30. Then, the user inserts the thermally expandable sheet 10 into the printing device 40 with the front side facing upward. The printing device 40 prints a heat conversion layer (front side conversion layer 81) on the front side of the inserted thermally expandable sheet 10 (step S1). The front side conversion layer 81 is formed by an ink that converts electromagnetic waves to heat. For example, the front side conversion layer 81 is formed by carbon black-containing black ink. The printing device 40 discharges the carbon black-containing black ink onto the front side of the thermally expandable sheet 10 in accordance with the designated front side foaming data. As a result, the front side conversion layer 81 is formed on the ink receiving layer 13, as illustrated in FIG. 13A. Note that, to facilitate comprehension, an example is illustrated in which the front side conversion layer 81 is formed on the ink receiving layer 13. However, more accurately, the black ink is received into the ink receiving layer 13 and, as such, the front side conversion layer 81 is formed in the ink receiving layer 13.

Second, the user inserts the thermally expandable sheet 10 onto which the front side conversion layer 81 is printed into the expansion device 50 with the front side facing upward.

Figure 13B:
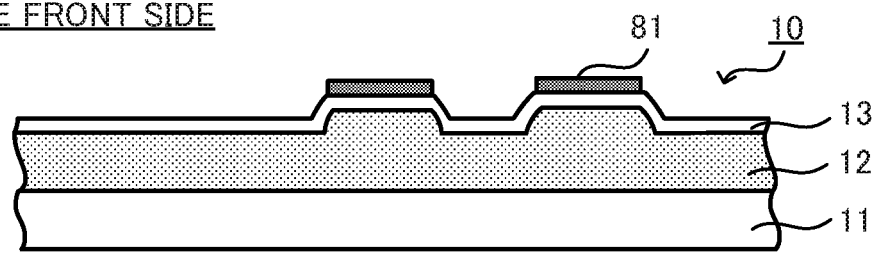

The expansion device 50 irradiates the inserted thermally expandable sheet 10 with electromagnetic waves from the front side (step S2). Specifically, the irradiator 60 of the expansion device 50 irradiates the front side of the thermally expandable sheet 10 with electromagnetic waves. The heat conversion material, included in the front side conversion layer 81 printed on the front side of the thermally expandable sheet 10, absorbs the irradiated electromagnetic waves, thereby generating heat. As a result, the front side conversion layer 81 generates heat and, as illustrated in FIG. 13B, the region of the thermally expansive layer 12 of the thermally expandable sheet 10 where the front side conversion layer 81 is printed distends and rises.

Figure 13C:
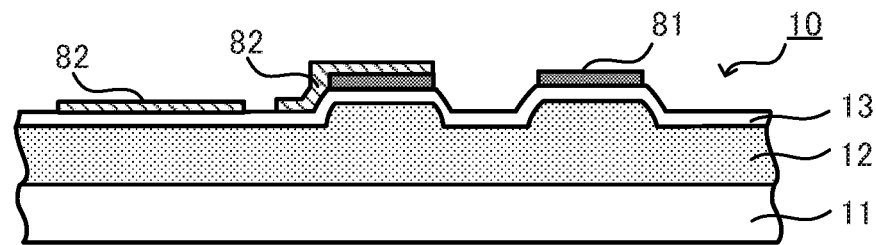

Third, the user inserts the thermally expandable sheet 10, of which a portion of the thermally expansive layer 12 is caused to distend, into the printing device 40 with the front side facing upward. The printing device 40 prints a color image (color ink layer 82) on the front side of the inserted thermally expandable sheet 10 (step S3). Specifically, the printing device 40 discharges the various cyan (C), magenta (M), and yellow (Y) inks onto the front side of the thermally expandable sheet 10 in accordance with the designated color image data. As a result, a color ink layer 82 is formed on the ink receiving layer 13, as illustrated in FIG. 13C. Note that, to facilitate comprehension, an example is illustrated in which the color ink layer 82 is formed on the ink receiving layer 13. However, more accurately, the color ink is received into the ink receiving layer 13.

Fourth, after forming the color ink layer 82, the color ink layer 82 is dried (step S4). For example, the user inserts the thermally expandable sheet 10, onto which the color ink layer 82 is printed, into the expansion device 50 with the back side facing upward, and the expansion device 50 heats the inserted thermally expandable sheet 10 from the back side and dries the color ink layer 82 formed on the front side of the thermally expandable sheet 10. Specifically, the irradiator 60 of the expansion device 50 irradiates the back side of the thermally expandable sheet 10 with electromagnetic waves, thereby heating the color ink layer 82 and volatilizing the solvent included in the color ink layer 82. Note that step S4 may be omitted.

Figure 13D:
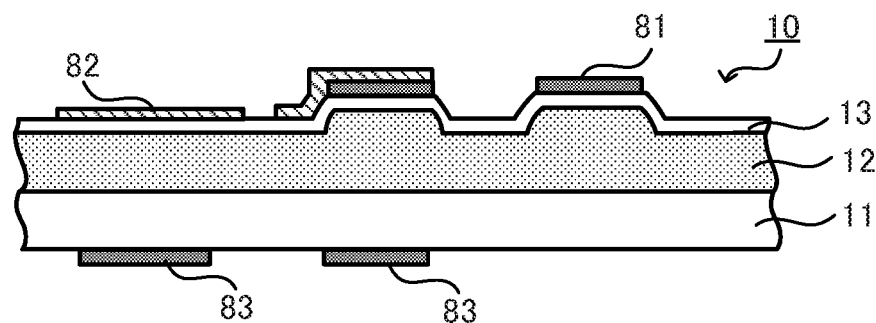

Fifth, the user inserts the thermally expandable sheet 10, onto which the color ink layer 82 is printed, into the printing device 40 with the back side facing upward. The printing device 40 prints a heat conversion layer (back side conversion layer 83) on the back side of the inserted thermally expandable sheet 10 (step S5). Similar to the front side conversion layer 81 printed on the front side of the thermally expandable sheet 10, the back side conversion layer 83 is a layer that is formed from a material that converts electromagnetic waves to heat, specifically carbon black-containing black ink. The printing device 40 discharges the carbon black-containing black ink onto the back side of the thermally expandable sheet 10 in accordance with the designated back side foaming data. As a result, the back side conversion layer 83 is formed on the back side of the base 11, as illustrated in FIG. 13D.

Figure 13E:
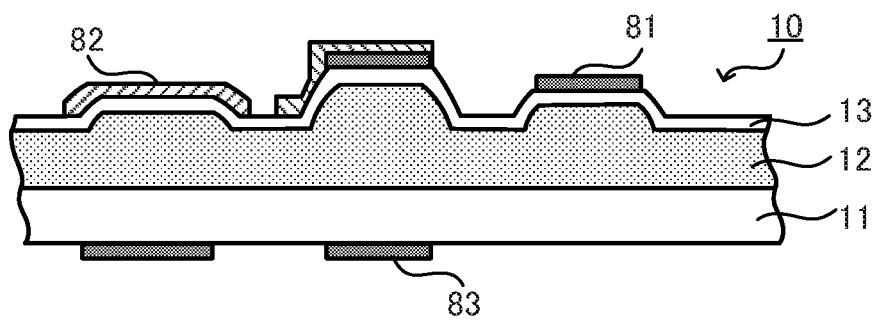

Sixth, the user inserts the thermally expandable sheet 10 onto which the back side conversion layer 83 is printed into the expansion device 50 with the back side facing upward. The expansion device 50 irradiates electromagnetic waves and heats the inserted thermally expandable sheet 10 from the back side (step S6). Specifically, the irradiator (not illustrated in the drawings) of the expansion device 50 irradiates the back side of the thermally expandable sheet 10 with electromagnetic waves. The back side conversion layer 83 printed on the back side of the thermally expandable sheet 10 absorbs the irradiated electromagnetic waves, thereby generating heat. As a result, as illustrated in FIG. 13E, the region of the thermally expansive layer 12 of the thermally expandable sheet 10 where the back side conversion layer 83 is printed bulges and rises.

The shaped object is formed on the front side of the thermally expandable sheet 10 as a result of carrying out the procedures described above.

Note that configurations are possible in which the heat conversion layer is formed only on the front side or on the back side. In cases in which only the front side conversion layer 81 is used to cause the thermally expansive layer 12 to distend, steps S1 to S4 of the processing described above are carried out. In cases in which only the back side conversion layer 83 is used to cause the thermally expansive layer 12 to distend, steps S3 to S6 of the processing described above are carried out.

The back side foaming processing of steps S5 and S6 may be carried out before the front side foaming processing of steps S1 and S2, and the printing and drying processing of the color ink layer 82 of steps S3 and S4 may be carried out before the front side foaming processing of steps S1 and S2. Alternatively, the printing of the front side conversion layer 81 in step S1 and the printing of the color ink layer 82 in step S3 may be carried out and, thereafter, the front side foaming processing of step S2 may be carried out. Thus, the sequence of the processing of steps S1 to S6 may be changed as desired.

As described above, when the intersections V of the lamp guard 66 of the expansion device 50 according to this embodiment are viewed from the movement direction G, all of the intersections V are separated from each other (do not overlap). In other words, the lamp guard 66 is configured or disposed such that two or more of the intersections V formed in the lamp guard 66 do not exist in the same row in the movement direction G. The lamp guard 66 can also be said to be parallel to the movement direction G, and configured or disposed such that there are no other intersections V positioned on a line that passes through a given intersection V (each line only passes through one intersection V).

The lamp guard 66 can also be said to be configured or disposed such that the passing positions, resulting from the movement of the irradiator 60, of the intersections V formed in the lamp guard 66 differ for each intersection V. As a result of this configuration, the loci L of a total number N of the intersections V formed by the outer shapes of the openings A become a total number N of straight lines extending in the movement direction G on the thermally expandable sheet 10 without overlapping. In other words, the number of times an intersection V passes directly above any position on the thermally expandable sheet 10, over which the lamp guard 66 can pass, is one or less.

Accordingly, at any position on the irradiation target, namely the thermally expandable sheet 10, reductions in the arrival of the electromagnetic waves caused by the passing of the intersections V formed by the outer shapes of the openings A of the mesh of the protective member, namely the lamp guard 66, can be suppressed, and uneven irradiation can be reduced.

Another Embodiment

An embodiment of the present disclosure is described above, but this embodiment is merely an example and does not limit the scope of application of the present disclosure. That is, various applications of the embodiments of the present disclosure are possible, and all embodiments are included in the scope of the present disclosure.

For example, in the embodiment described above, the openings A of the lamp guard 66 are square. However, the shape of the openings A of the lamp guard 66 is not limited to square. For example, the shape of the openings A of the lamp guard 66 may be parallelogramical, rhomboidal, rectangular, regular hexagonal, isosceles triangular, or the like. When, for example, the shape of the openings A is parallelogramical, the intersections V can be configured by fixing the long side of the lamp guard 66 and two sides of the openings A in the same direction. Moreover, when the shape of the opening A is mainly rectangular, the various intersections V of the openings A will not be acute and the lamp guard 66 will be easier to produce. When the shape of the openings A is mainly square, it is sufficient to consider 0° to 45° for θ. Note that, even when the shape of the openings A is a shape other than square, the openings A positioned on the periphery of the lamp guard 66 may have a shape that is a partial shape of the shape of the openings A positioned in the center of the lamp guard 66.

Figure 14:
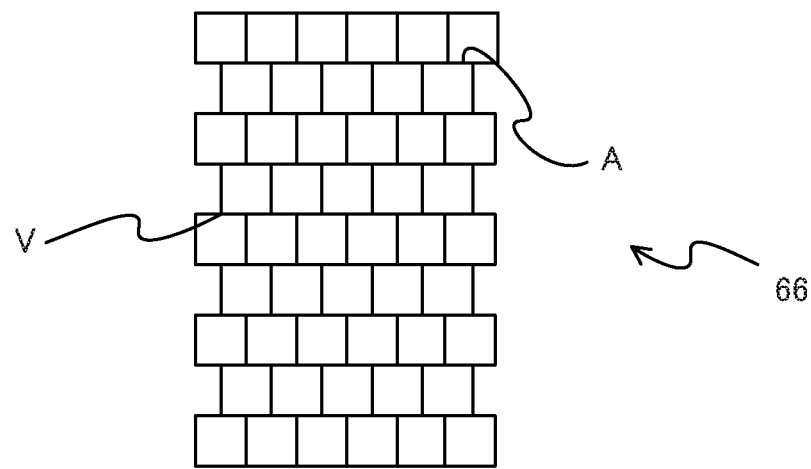
FIG. 14 is a drawing illustrating another embodiment of the configuration of the openings of the lamp guard.

In the embodiment described above, an example is given of a case in which the openings A of the lamp guard 66 are disposed at an equal pitch. However, the disposal of the openings A is not limited thereto. For example, as illustrated in FIG. 14, a configuration is possible in which the openings A of the lamp guard 66 are disposed offset a half pitch. Additionally, in the present disclosure, the terms "lattice-like" or "lattice" are not limited to cases in which the pitch at which the openings A are disposed are equivalent as in FIG. 9, and include cases in which the pitch at which the openings A are disposed differs as in FIG. 14. The same applies to the terms "net-like" and "net." In the lamp guard 66 illustrated in FIG. 14 as well, the intersections V defined by the openings A are configured or disposed such that two or more of the intersections V do not exist in the same row in the movement direction G. The lamp guard 66 can also be said to be parallel to the movement direction G, and configured or disposed such that there are no other intersections V positioned on a line that passes through a given intersection V (each line only passes through one intersection V).

Figure 15:
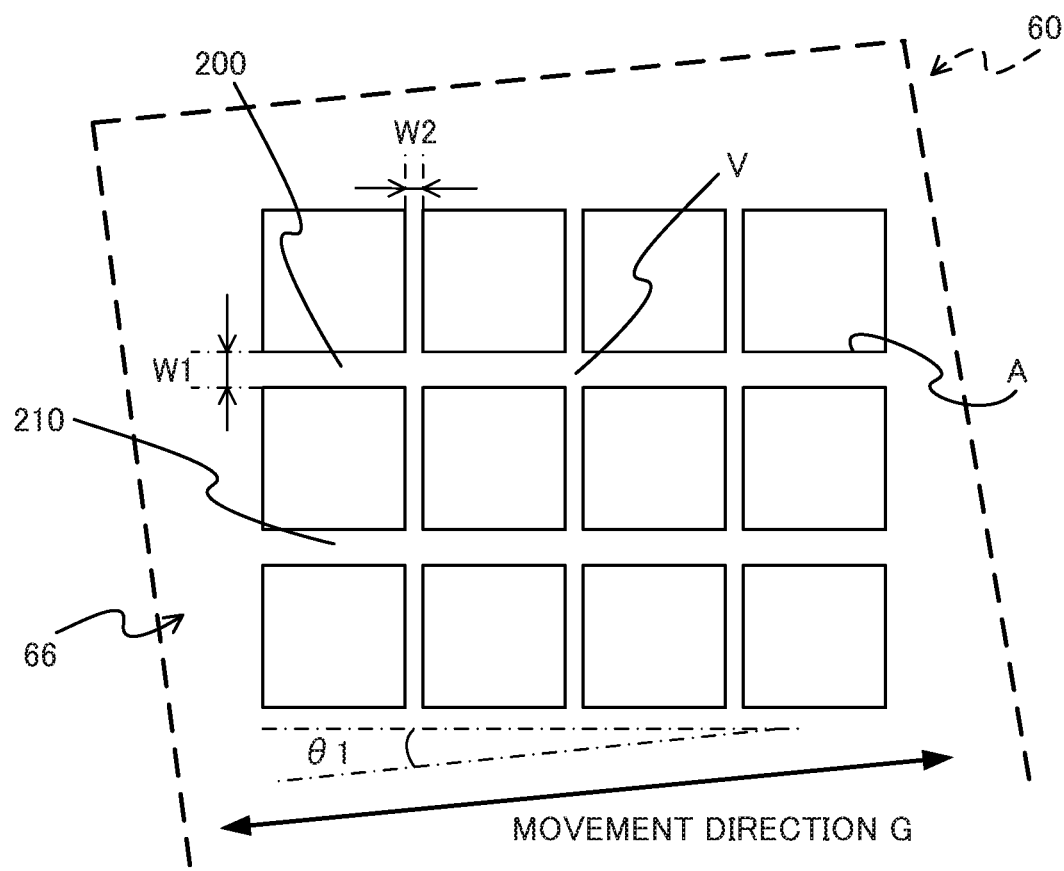
FIG. 15 is a drawing illustrating another embodiment of the outer shapes of the openings of the lamp guard.

In the embodiment described above, the width W of the lattice defined by the openings A illustrated in FIG. 9 is constant. However, the configuration of the lamp guard 66 is not limited thereto. For example, as illustrated in FIG. 15, a configuration is possible in which the lamp guard 66 includes a first lattice that extends with an angle of θ1 with respect to the movement direction G and a second lattice that is orthogonal to the first lattice. The first lattice extends from one side perpendicular to the irradiator movement direction G of the lamp guard 66 to another side that faces the one vertical side. In this case, the openings A are defined by the first lattice and the second lattice. As illustrated in FIG. 15, a width W1 of the first lattice may be less than a width W2 of the second lattice. Additionally, the angle θ1 formed by the first lattice and the movement direction G is set such that 0°<θ1<45°. Moreover, when viewed from the irradiator movement direction G, a line segment 200 of the first lattice and a line segment 210 adjacent to the line segment 200 may be separated from each other. In other words, the locus of the line segment 200 in the movement direction G does not cross the line segment 210. As illustrated in FIG. 15, when the width W1 of the first lattice is greater than the width W2 of the second lattice, the first lattice, in addition to the intersections V, may affect uneven irradiation. In order to reduce this uneven irradiation, it is preferable that the locus of the line segment 200 in the movement direction G does not cross the line segment 210.

In the embodiment described above, as illustrated in FIG. 7, the lamp guard 66 has a side 110 that is parallel to the irradiator movement direction G and a side 120 that is perpendicular to the irradiator movement direction G. Line segments 150 and 160 are formed by the outer shapes of the plurality of openings A of the lamp guard 66. These line segments 150 and 160 are substantially parallel to the side 110. The line segments 150 and 160 extend from the side 120 to a side 130 that faces the side 120. This case differs from the case illustrated in FIG. 7, and it is preferable that the adjacent line segments 150 and 160 do not overlap when viewed from the irradiator movement direction G. It can also be said that a line that is parallel to the movement direction G and that passes through a first end of the line segment 150 on the side 120 side, and a line that is parallel to the movement direction G and that passes through a second end of the line segment 150 on the side 130 side do not pass through the line segment 160. Moreover, uneven irradiation can be reduced even further by ensuring a large space S between the line segments 150 and 160.

In the embodiment described above, the lamp guard 66 is attached to the opening below the irradiator 60. However, a configuration is possible in which, provided that a protective member corresponding to the lamp guard 66 can protect the lamp heater 61, the lamp guard 66 need not be attached to the irradiator 60. For example, the lamp heater 61 may be protected by disposing a protective member that partitions the irradiator 60 from the thermally expandable sheet 10 or similar irradiation target.

In the embodiment described above, a configuration is described in which the irradiation target, namely the thermally expandable sheet 10, is fixed and the irradiator 60 is caused to move. However, a configuration is possible in which the irradiation target is cause to move and the irradiator 60 is fixed. Alternatively, a configuration is possible in which both the irradiation target and the irradiator 60 are caused to move or are caused to relatively move in a predetermined direction with respect to each other. In the embodiment described above, the irradiator 60 is caused to perform linear, relative movement with respect to the irradiation target. However, a configuration is possible in which the irradiator 60 is caused to perform circular, elliptical, sinusoidal, or similar non-linear relative movement. In such a case, it is preferable that the relative movement loci L of a total number N of the intersections V formed by the outer shapes of the openings A become a total number N of straight lines extending in the irradiator movement direction G on the thermally expandable sheet 10 without overlapping.

In the embodiment described above, the thermally expandable sheet 10 includes the base 11, the thermally expansive layer 12, and the ink receiving layer 13. However, the configuration of the thermally expandable sheet 10 is not limited thereto. For example, configurations are possible in which the thermally expandable sheet 10 does not include the ink receiving layer 13, or includes a peelable release layer on the front side or the back side. Alternatively, the thermally expandable sheet 10 may include a layer made from another desired material.

In the embodiment described above, the terminal device 30, the printing device 40, and the expansion device 50 are independent devices. However, any two or more of the terminal device 30, the printing device 40, and the expansion device 50 may be integrated.

In the embodiment described above, the thermally expandable sheet 10 and the expansion device 50 are respectively implemented as the irradiation target and the irradiation device. However, if the irradiation device includes an irradiator that irradiates the irradiation target with electromagnetic waves, a different irradiation target and/or irradiation device may be implemented.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An expansion device, comprising:
a tray on which a thermally expandable sheet is disposed;
an irradiator configured to irradiate the thermally expandable sheet disposed on the tray with electromagnetic waves; and
a driver that, while the irradiator is being caused to emit the electromagnetic waves, moves the irradiator along the thermally expandable sheet disposed on the tray, thereby causing the thermally expandable sheet to distend; wherein
the irradiator includes a lamp guard provided with a plurality of openings, and
all intersections formed by outer shapes of the plurality of openings do not overlap as viewed in an irradiator movement direction that is a direction of movement of the irradiator caused by the driver.

2. The expansion device according to claim 1, wherein the irradiator further includes:
a lamp that emits electromagnetic waves;
a reflection plate that is disposed above the lamp, the reflection plate being configured to reflect the emitted electromagnetic waves toward the thermally expandable sheet, wherein
the lamp guard is disposed on an opening of the reflection plate such that the lamp guard and the reflection plate surround the lamp.

3. The expansion device according to claim 2, wherein a shape of the openings of the lamp guard is parallelogramical.

4. The expansion device according to claim 3, wherein the lamp guard is of a rectangular shape including a first side that is parallel to the irradiator movement direction and a second side that is perpendicular to the irradiator movement direction,
a first line segment and a second line segment are defined by the plurality of openings of the lamp guard, the first line segment and the second line segment being substantially parallel to the first side,
the first line segment and the second line segment extend from the second side to a side that faces the second side, and
the first line segment and the second line segment are adjacent to each other and, as viewed in the irradiator movement direction, do not overlap.

5. The expansion device according to claim 2, wherein a shape of the openings of the lamp guard is rectangular.

6. The expansion device according to claim 5, wherein the lamp guard is of a rectangular shape including a first side that is parallel to the irradiator movement direction and a second side that is perpendicular to the irradiator movement direction,
a first line segment and a second line segment are defined by the plurality of openings of the lamp guard, the first line segment and the second line segment being substantially parallel to the first side,
the first line segment and the second line segment extend from the second side to a side that faces the second side, and
the first line segment and the second line segment are adjacent to each other and, as viewed in the irradiator movement direction, do not overlap.

7. The expansion device according to claim 2, wherein a shape of the openings of the lamp guard is square.

8. The expansion device according to claim 7, wherein the lamp guard is of a rectangular shape including a first side that is perpendicular to the irradiator movement direction,
a line segment defined by the plurality of openings of the lamp guard extends from the first side to a second side that faces the first side, and
the line segment is inclined at an angle greater than 0° and less than 45° with respect to the irradiator movement direction.

9. A shaping system, comprising:
the expansion device according to claim 8; and
a printing device that prints a conversion layer on the thermally expandable sheet, the conversion layer converting electromagnetic waves into heat; wherein
the expansion device causes the irradiator to irradiate the thermally expandable sheet, on which the conversion layer has been printed by the printing device, with electromagnetic waves while moving the irradiator by using the driver, thereby causing the thermally expandable sheet to distend.

10. The expansion device according to claim 7, wherein the lamp guard is of a rectangular shape including a first side that is parallel to the irradiator movement direction and a second side that is perpendicular to the irradiator movement direction,
a first line segment and a second line segment are defined by the plurality of openings of the lamp guard, the first line segment and the second line segment being substantially parallel to the first side,
the first line segment and the second line segment extend from the second side to a side that faces the second side, and
the first line segment and the second line segment are adjacent to each other and, as viewed in the irradiator movement direction, do not overlap.

11. A shaping system, comprising:
the expansion device according to claim 1; and
a printing device that prints a conversion layer on the thermally expandable sheet, the conversion layer converting electromagnetic waves into heat; wherein
the expansion device causes the irradiator to irradiate the thermally expandable sheet, on which the conversion layer has been printed by the printing device, with electromagnetic waves while moving the irradiator by using the driver, thereby causing the thermally expandable sheet to distend.

* * * * *